United States Patent [19]

Cusumano et al.

[11] Patent Number: 5,680,118
[45] Date of Patent: Oct. 21, 1997

[54] VEHICLE SIGNAL APPARATUS

[75] Inventors: Eileen Therese Cusumano, Clinton Township; Tim Roth Schlax, Shelby Township, both of Mich.

[73] Assignee: General Motors Corporation, Detroit, Mich.

[21] Appl. No.: 661,123

[22] Filed: Jun. 10, 1996

[51] Int. Cl.$^6$ .................................................. G08G 1/16
[52] U.S. Cl. ..................... 340/903; 340/904; 340/436; 180/170; 342/70; 364/461; 364/426.01; 364/426.041
[58] Field of Search .............................. 340/903, 904, 340/901, 435, 436; 180/169, 170; 342/70, 71, 72; 364/461, 426.01, 426.04

[56] References Cited

U.S. PATENT DOCUMENTS

| | | | |
|---|---|---|---|
| 3,835,361 | 9/1974 | Schubring | 318/561 |
| 4,143,370 | 3/1979 | Yamanaka et al. | 343/7 VM |
| 4,703,429 | 10/1987 | Sakata | 364/426 |
| 5,014,200 | 5/1991 | Chundrlik et al. | 364/426.04 |
| 5,173,859 | 12/1992 | Deering | 364/426.01 |
| 5,454,442 | 10/1995 | Labuhn et al. | 180/169 |

OTHER PUBLICATIONS

Millimeter–Wave Radars for Automotive Use; T. Takehana, H. Iwamoto, T. Sakamoto, T. Nogami Int'l Congress on Transportation Electronics; Proceedings; Hyatt Regency, Dearborn, MI Oct. 17–18, 1988.

Automotive Radar Using mm Wave; T. Takehana, Y. Isogai and T. Sakamoto; Fujitsu ten Ltd. Toyota Motor Co., Ltd., Japan.

Primary Examiner—Jeffery Hofsass
Assistant Examiner—Nina Tong
Attorney, Agent, or Firm—Robert M. Sigler

[57] ABSTRACT

Apparatus provides a signal to an operator of a following vehicle when it is necessary to take appropriate action to avoid coming within a predetermined distance of a lead vehicle proceeding in the same direction. From initial predicted forward velocities and distances of the lead and following vehicles, the signal apparatus derives subsequent predicted velocities and positions of the lead and following vehicles and a subsequent predicted distance D(t) between the lead vehicle and the following vehicle after a projected short time interval while assuming a predetermined braking action of the following vehicle (2), derives and compares the subsequent predicted distance D(t) between the lead vehicle and the following vehicle with a least distance $D_{LEAST}$, and (3) sets the least distance $D_{LEAST}$ equal to the subsequent predicted distance D(t) between the lead vehicle and the following vehicle if the latter is smaller. The signal apparatus iteratively applies the calculating means, beginning with forward velocities and positions derived from sensor signals as the initial predicted forward velocities and distances in the first iteration and generates a signal if and when the least distance becomes smaller than a minimum allowable distance $D_{MIN}$.

5 Claims, 2 Drawing Sheets

VEHICLE SIGNAL APPARATUS

BACKGROUND OF THE INVENTION

The technical field of this invention is motor vehicle signal apparatus and particularly such apparatus on a following vehicle for signaling its operator of the need for immediate braking to avoid approaching too closely to a lead vehicle proceeding in the same direction. Such systems in the prior art have usually been based on "stopping equations" wherein, with varying degrees of completeness and sophistication, the stopping distances of the lead and following vehicles are computed from sensed present vehicle velocities and predicted final positions of the vehicles are compared to determine if contact is likely. However, since such an approach bases its predictions only on final positions of the vehicles, it does not detect the likelihood of contact between the vehicles at an intermediate time if the predicted final positions would not indicate contact. For example, a following vehicle initially moving faster than a lead vehicle but capable of decelerating faster than the lead vehicle could close and contact the lead vehicle before the vehicles could separate due to the faster deceleration of the following vehicle, even though the stopping equations might show the vehicles separated at the time the following vehicle would normally come to a stop.

SUMMARY OF THE INVENTION

It is an object of this invention to signal an operator of a following vehicle when it is necessary to take appropriate action to avoid coming within a predetermined distance of a lead vehicle proceeding in the same direction. This object is achieved in a signal apparatus for a following vehicle which comprises sensing means on the following vehicle for determining actual forward velocities and positions of the following vehicle and a lead vehicle moving ahead of the following vehicle in the same direction and calculating means on the following vehicle for (1) deriving, from initial predicted forward velocities and distances of the lead and following vehicles, subsequent predicted velocities and positions of the lead and following vehicles and a subsequent predicted distance D(t) between the lead vehicle and the following vehicle after a projected short time interval while assuming a predetermined braking action of the following vehicle, (2) deriving and comparing the subsequent predicted distance D(t) between the lead vehicle and the following vehicle with a least distance $D_{LEAST}$, and (3) setting the least distance $D_{LEAST}$ equal to the subsequent predicted distance D(t) between the lead vehicle and the following vehicle if the latter is smaller. The signal apparatus further comprises control means for iteratively applying the calculating means, beginning with the actual forward velocities and positions as the initial predicted forward velocities and distances in the first iteration and signal means for generating a signal if and when the least distance becomes smaller than a minimum allowable distance $D_{MIN}$.

Further details and advantages of the invention will be apparent from the accompanying drawings and following description of a preferred embodiment.

DESCRIPTION OF A PREFERRED EMBODIMENT

Figure 1:
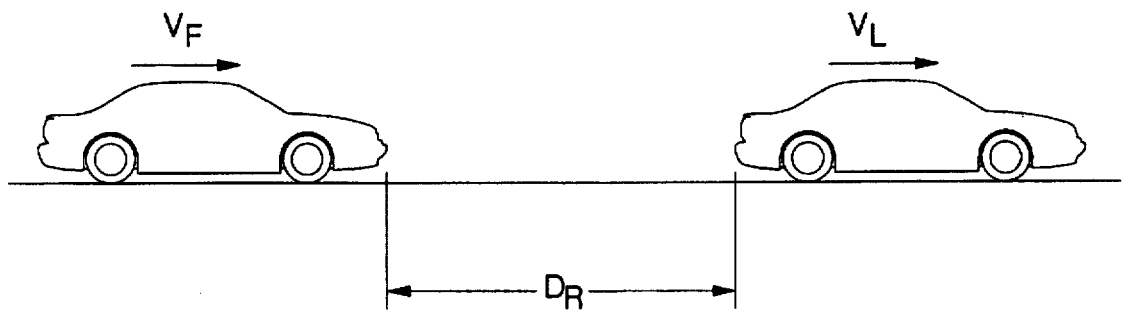
FIG. 1 is a schematic diagram of a lead vehicle and a following vehicle proceeding in the same direction and separated by a distance $D_R$.
Figure 2:
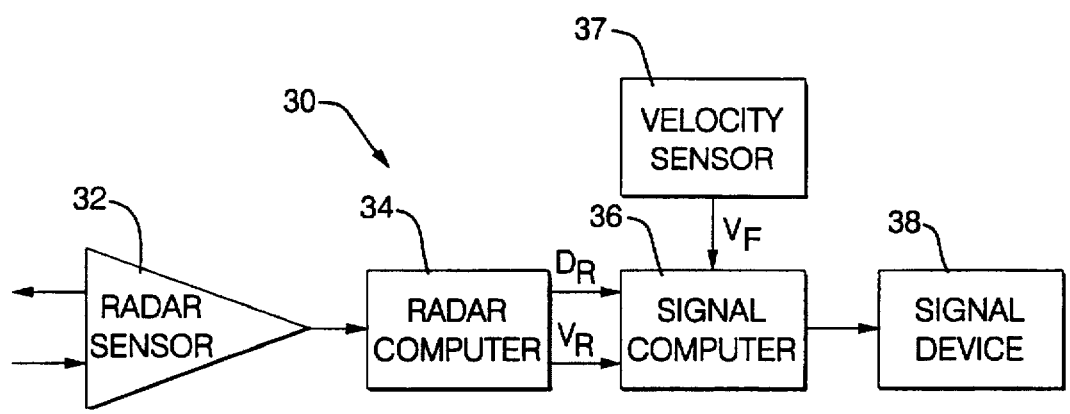
FIG. 2 is a block diagram of a signal apparatus according to the invention.

Referring to FIG. 1, a following vehicle 10 is proceeding with velocity $V_F$ a distance $D_R$ behind and in the same direction as a lead vehicle 20, which has velocity $V_L$. The following vehicle is provided with signal apparatus 30, which is shown in FIG. 2 in block diagram form. Signal apparatus 30 receives information relative to lead vehicle 20 via an appropriate sensor of sensors: in this embodiment, a forward directed radar sensor 32. Output signals from radar sensor 32 are provided to a radar computer 34, which derives therefrom a measure of the distance $D_R$ to lead vehicle 20 and the relative velocity $V_R$ between vehicles 10 and 20. Radar sensors such as sensor 32 and radar computers such as computer 34 are known to those skilled in the art; and such conventional apparatus is acceptable for this system. Alternatively, any other sensor capable of accurately generating the required signals could be used; examples include laser and optical based sensors.

Radar computer 34 outputs signals representing $D_R$ and $V_R$ to a signal computer 36, which also receives a signal of the velocity $V_F$ of following vehicle 10 from a conventional vehicle velocity sensor 37 thereon. Signal computer 36 processes the signals received to predict whether the vehicles are likely to come closer together than a predetermined allowable distance $D_{MIN}$ if the lead vehicle were to brake from its present velocity and the following vehicle were to brake after a predetermined reaction time. If this occurrence is predicted, an output signal is provided to a signal device 38, which produces an audible, visual or similar signal to warn the following vehicle operator of the situation.

Signal computer 36 may take the form of a programmed digital computer based on a microprocessor and having input/output apparatus for communication with devices 34, 37 and 38. The computer is provided with memory in which is stored a program for processing the information received and generating the output signal. If signal computer 36 only performs the function described herein, the program may run repeatedly and continuously. If this function is only one of a plurality of functions performed by the computer, the relevant portion of the program may be a subroutine called by a main program or by a timer generated interrupt, depending on how the designer decides to integrate this subroutine into the total system.

Figure 3:
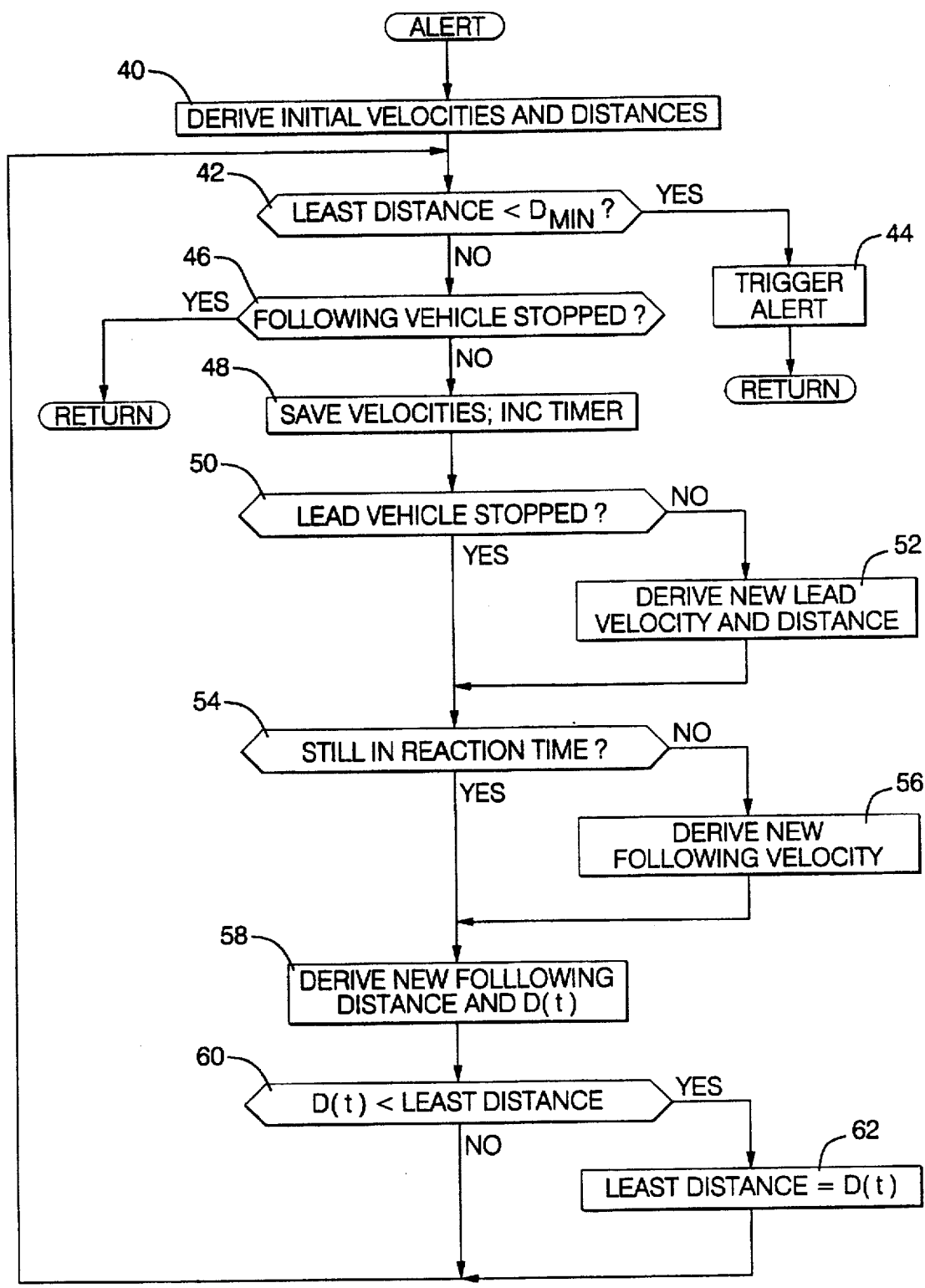
FIG. 3 is a flow chart of a subroutine in a computer program for use in the signal apparatus of FIG. 2.

In this embodiment, the flow chart of FIG. 3 is presented in the form of a subroutine ALERT which can be called from a larger program or by a timer interrupt in signal computer 36. Subroutine ALERT begins at step 40 by reading the latest values of distance $D_R$ and relative velocity $V_R$ obtained from radar computer 34 and of the following vehicle velocity $V_F$ obtained from velocity sensor 37 and deriving the present velocities and positions of both vehicles and a least distance between the vehicles for use as initial values in a set of iterative calculations. The initial value of the predicted velocity of the following vehicle $V_F(t)$ is set equal to the latest sensed value of the following vehicle velocity $V_F$; and the initial value of the predicted velocity of the lead vehicle $V_L(t)$ is determined by adding the latest sensed value of the relative velocity $V_R$ to the following vehicle velocity $V_F$. The initial value of the predicted position of the following vehicle $D_F(t)$ can be set equal to zero; and the initial value of the predicted position of the lead vehicle $D_L(t)$ can be set equal to sensed distance $D_R$. The initial value of the predicted initial least distance $D_{LEAST}$ between the vehicles is set equal to the sensed distance $D_R$.

Subroutine ALERT determines in step 42 whether the predicted least distance $D_{LEAST}$ or is less than the predetermined allowable least distance $D_{MIN}$, which is stored in memory. Starting from the sensed value of distance $D_R$, and using the last sensed vehicle velocities, the subroutine will be repeatedly calculate new predicted values of $D_{LEAST}$ for short time intervals projected into the future, with both vehicles braking, until the following vehicle stops or $D_{LEAST}$ becomes less than $D_{MIN}$; and the value of $D_{LEAST}$ will thus predict how close the vehicles will come, based on those last sensed vehicle parameters. The stored value $D_{MIN}$ is the value of $D_{LEAST}$ which will cause an ALERT signal to be generated. Preferably, therefore, the stored value $D_{MIN}$ will be some predetermined value greater than zero by an amount sufficient to allow avoidance of contact if the driver of the following vehicle reacts appropriately to the ALERT signal. If, at step 42, the value of $D_{LEAST}$ is less than $D_{MIN}$, then it has been determined that the vehicles are likely to come closer than the minimum allowable distance; and the subroutine generates an output at step 44 to signal device 38 to trigger the generation of an ALERT signal to the vehicle operator. In the case of an ALERT signal in response to the initial comparison when the subroutine is called, the vehicles are already closer than the minimum allowable distance, since the value of $D_{LEAST}$ is initially set equal to the sensed distance $D_R$ between the vehicles. However, it should be emphasized that a calculated value of $D_{LEAST}$ which is less than $D_{MIN}$ on an iterative loop after the initial comparison does not mean that the vehicles are now closer than the minimum allowable distance; rather, it means that they are predicted to be so in the future.

If the predicted least distance $D_{LEAST}$ is still greater than $D_{MIN}$ at step 42, the subroutine next determines, at step 46, if the following vehicle is stopped: that is, if $V_F(t)$ is zero. If so, there is no possibility of approaching closer to the lead vehicle. The set of iterations is thus completed; and the program returns from the subroutine.

If the following vehicle is still moving, however, the subroutine proceeds to the next (in this case the first) iteration of its predictive calculations. First, at step 48, the present values of predicted velocity and distance $V_F(t)$, $V_L(t)$, $D_F(t)$ and $D_L(t)$ are saved as previous values $V_F(t-1)$, $V_L(t-1)$, $D_F(t-1)$ and $D_L(t-1)$, respectively. In addition, a reaction timer, initialized at zero, is incremented. This timer will be incremented during each successive iteration of the predictive calculations so as to allow the inclusion of an assumed reaction time of the driver of the following vehicle to an ALERT signal hypothetically provided at the time of initiation of the predictive calculations. As will be seen, the subroutine uses the reaction timer to delay changes in the predicted velocity of the following vehicle for the number of calculation loops which corresponds to the assumed driver reaction time.

At step 50, the subroutine determines if the lead vehicle velocity $V_L(t-1)$ is greater than zero. If it is, the new lead vehicle velocity $V_L(t)$ and distance $D_L(t)$ are computed in step 52 from the following equations:

$$V_L(t)=V_L(t-1)-d_{al}*\Delta t*(1-\exp(-TIMER/\tau_l))$$

$$D_L(t)=D_L(t-1)+\tfrac{1}{2}*(V_L(t)+V_L(t-1))*\Delta t$$

before proceeding to step 54. In these equations, $da_{al}$ is the presumed deceleration of the lead vehicle. $\Delta t$ is the presumed time increment between the moments represented by successive iterations, TIMER is the timer value and $\tau_l$ is the braking efficiency of the lead vehicle. If the lead vehicle velocity $V_L(t-1)$ was zero at step 50, then $D_L(t)=D_L(t-1)$; and there is no need to perform either calculation. In this case, therefore, the subroutine skips step 52 and proceeds directly from step 50 to step 54.

In step 54, the subroutine compares variable TIMER to a stored or derived reaction time value to determine if the projected time is still within the assumed reaction time of the following vehicle driver. If the reaction time is past, the new following vehicle velocity is computed in step 56 by the equation:

$$V_F(t)=V_F(t-1)-d_{af}*\Delta t*(1-\exp(-TIMER/\tau_f))$$

which is similar to the equation for the lead vehicle but with most parameters associated with the following vehicle. If the projected time is still within the reaction time at step 54, then $V_F(t)=V_F(t-1)$; and the calculation is not performed.

From step 56, or from step 54 if the reaction time is still projected, the subroutine proceeds to step 58, in which it calculates the new distance of the following vehicle according to the equation:

$$D_F(t)=D_F(t-1)+\tfrac{1}{2}*(V_F(t)+V_F(t-1))*\Delta t$$

In step 58, the subroutine also calculates a new value for the difference $D(t)$ between the vehicles:

$$D(t)=D_L(t)-D_F(t)$$

The subroutine then compares the new value of $D(t)$ with the least distance $D_{LEAST}$ in step 60 to determine if a new, smaller least distance is projected. If not, the value of $D_{LEAST}$ is unchanged and the subroutine returns to step 42 for comparison with $D_{MIN}$ in another loop. If so, however, the least distance $D_{LEAST}$ is set equal to the new value $D(t)$ before returning.

The subroutine will thus perform iterative derivations of the least distance $D_{LEAST}$ and compare the values with $D_{MIN}$ until an ALERT signal is generated or the projected velocity of the following vehicle is zero, whereupon the subroutine will be exited.

We claim:

1. Signal apparatus for a following vehicle comprising, in combination:

sensing means on the following vehicle for periodically determining actual forward velocity and position parameters of the following vehicle and a lead vehicle moving ahead of the following vehicle in the same direction;

calculating means on the following vehicle for (1) deriving, from initial predicted forward velocity and position parameters of the lead and following vehicles, subsequent predicted forward velocity and position parameters of the lead and following vehicles and a subsequent predicted distance $D(t)$ between the lead vehicle and the following vehicle after a projected short time interval while assuming predetermined braking actions of the lead vehicle and the following vehicle, (2) deriving and comparing the subsequent predicted distance $D(t)$ between the lead vehicle and the following vehicle with a least distance $D_{LEAST}$, and (3) setting the least distance $D_{LEAST}$ equal to the subsequent predicted distance $D(t)$ between the lead vehicle and the following vehicle if the latter is smaller;

control means effective, after each periodic determination of the actual forward velocities and positions by the sensing means, for iteratively applying the calculating means, the control means using the actual forward velocity and position parameters determined by the sensing means as the initial predicted forward velocity and position parameters in the first iteration and further using the subsequent predicted forward velocity and position parameters from each iteration as the initial predicted forward velocity and position parameters in the next iteration; and signal means for generating a signal if and when the least distance $D_{LEAST}$ becomes smaller than a minimum allowable distance $D_{MIN}$.

2. The signal apparatus of claim 1 in which the control means, after each periodic determination of the actual forward velocity and position parameters by the sensing means, iteratively applies the calculating means until a forward velocity of the following vehicle is zero or the signal is generated, whichever occurs first.

3. The signal apparatus of claim 1 further comprising means for incrementing a timer value with each iterative application of the calculating means and assuming the predetermined braking action of the following vehicle to be no braking and thus preventing projected change in the initial predicted forward velocity and position parameters due to change in a forward velocity of the following vehicle until the timer value equals a reference indicating the end of a driver reaction time.

4. The signal apparatus of claim 2 in which the predicted forward velocity of the following vehicle is one of the initial predicted forward velocity and position parameters.

5. The signal apparatus of claim 2 in which the predicted forward velocity of the following vehicle is one of the subsequent predicted forward velocity and position parameters.

* * * * *